J. W. WHITE.
WHEEL TRACTION DEVICE.
APPLICATION FILED OCT. 9, 1920.
1,384,546.
Patented July 12, 1921.
2 SHEETS—SHEET 2.
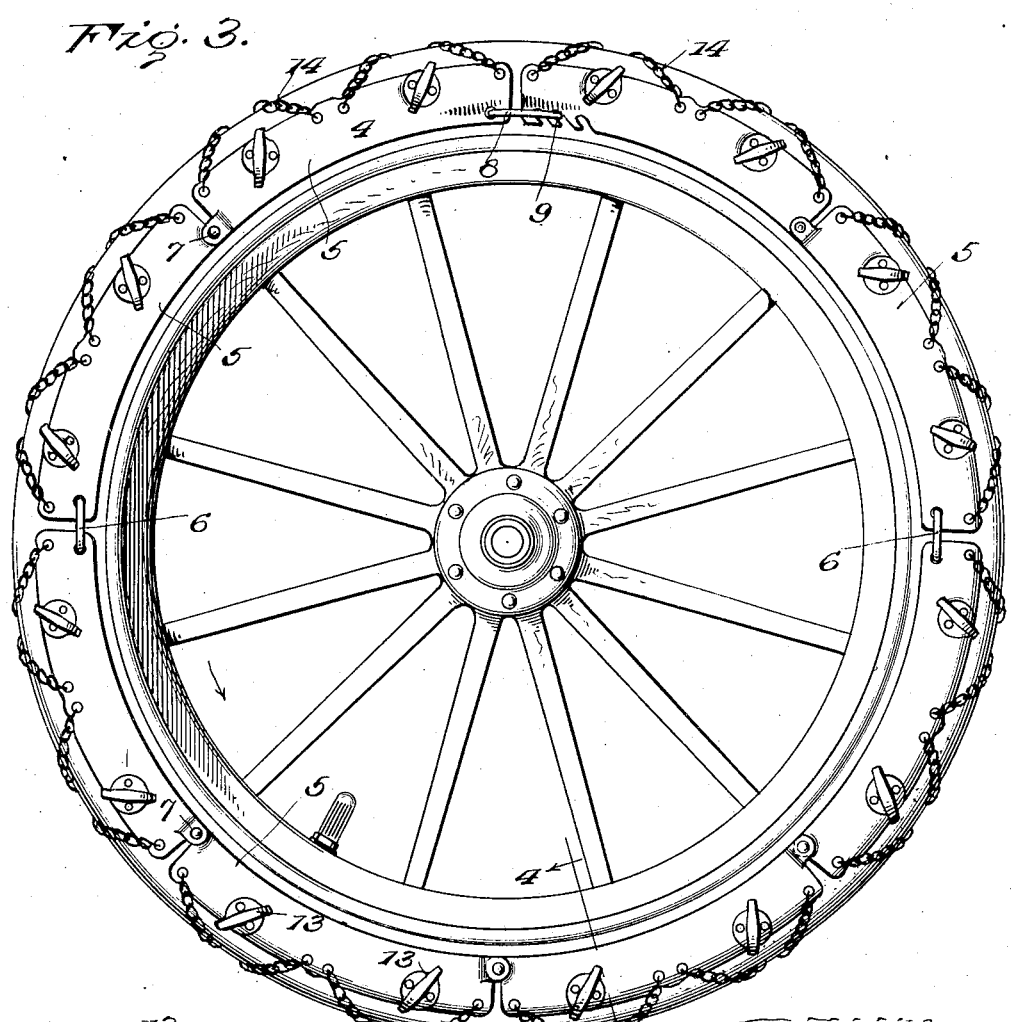
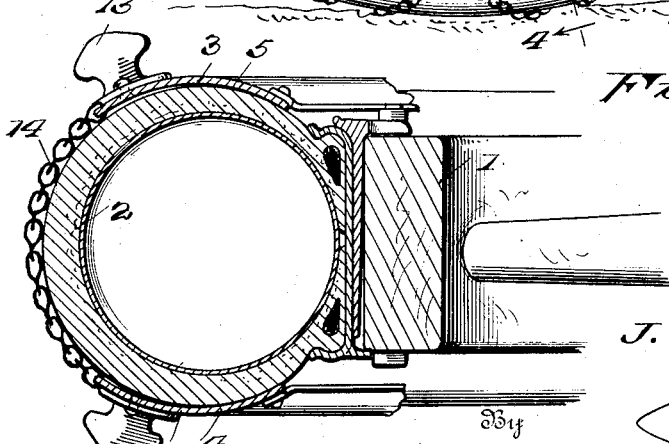
Inventor
J. Wesley White.
Attorney

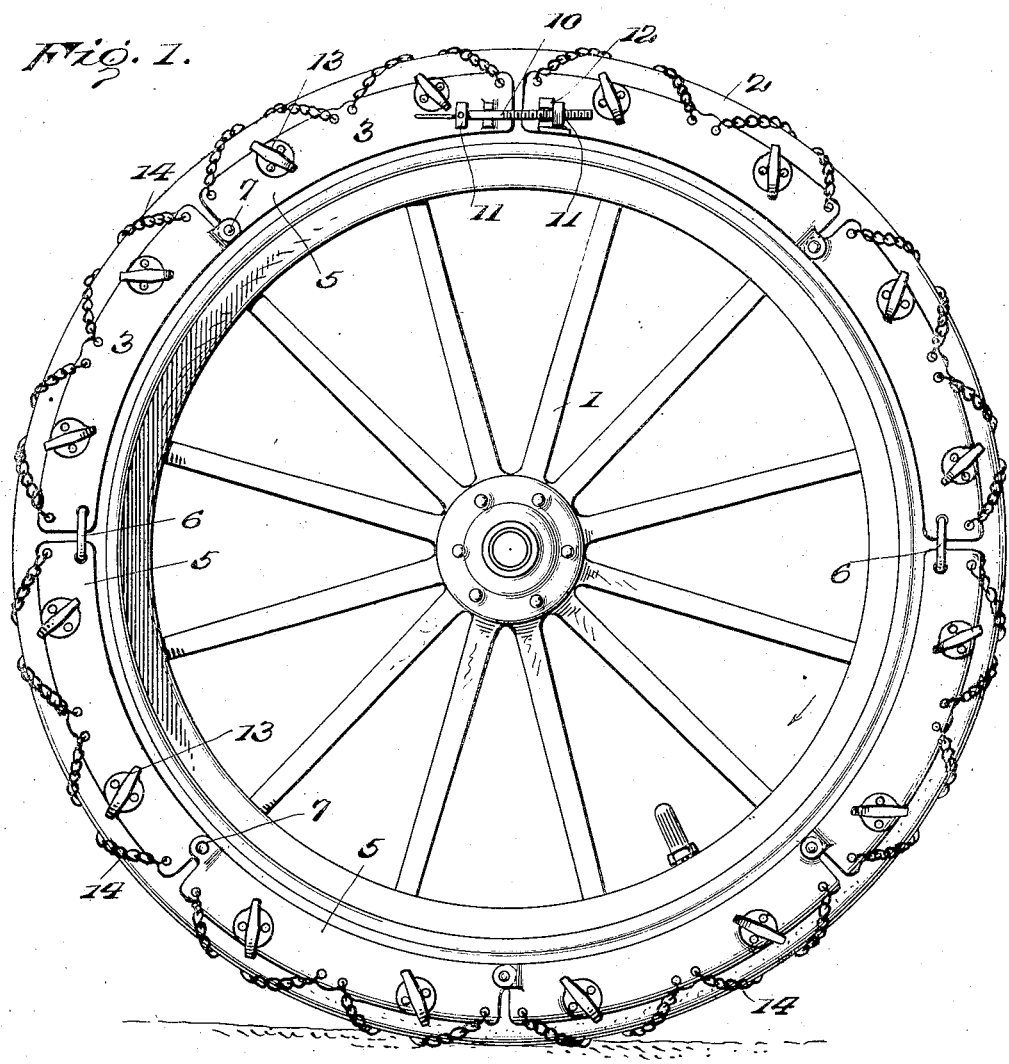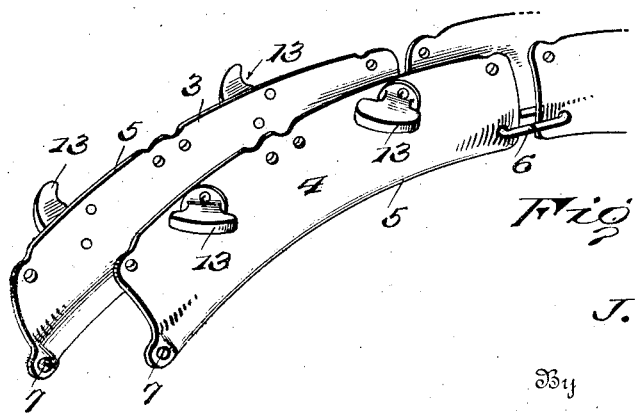

UNITED STATES PATENT OFFICE.

JOHN WESLEY WHITE, OF LEWISTOWN, MONTANA, ASSIGNOR OF ONE-HALF TO WILLIAM D. ROSE, OF LEWISTOWN, MONTANA.

WHEEL-TRACTION DEVICE.

1,384,546.  Specification of Letters Patent.  Patented July 12, 1921.

Application filed October 9, 1920. Serial No. 415,713.

*To all whom it may concern:*

Be it known that I, JOHN WESLEY WHITE, a citizen of the United States, residing at Lewistown, in the county of Fergus and State of Montana, have invented certain new and useful Improvements in Wheel-Traction Devices, of which the following is a specification.

This invention relates to traction devices to be removably applied to vehicle wheels when increase of traction is desired.

The invention comprises a series of plates adapted to be applied to the respective sides of the tire and to conform to the shape of the tire, such plates being arranged for connection to provide sufficient flexibility to avoid tire injury. Traction elements are secured to the plates and arranged with particular regard to increasing the tractive action in soft surfaces; and the plates are interconnected by chain elements extending across the tire, preferably diagonally. These chain elements add their well-known tractive result to the general structure, and at the same time provide for holding the plates in connected relation.

In the drawings:—

Figure 1 is a view in elevation of a vehicle wheel, showing the tire thereof provided with the improved traction device.

Fig. 2 is a perspective detail, showing several of the plates in connected relation.

Fig. 3 is an elevation similar to Fig. 1, but from the opposite side of the wheel.

Fig. 4 is an enlarged section on the line 4—4 of Fig. 3.

In the improvement, as here illustrated, 1 represents an ordinary wheel, and 2 the tire thereof, such being shown as the usual pneumatic tire.

The improved traction device comprises a tire engaging member for each side wall of the casing, as 3 and 4, each such member being made up of a series of plates 5, which are of an appropriate length, and each shaped to conform more or less to the shape of the side wall of the tire. The plates bear at their inner edge substantially against the wheel or demountable rim, and terminate at their outer edge inwardly of the tread portion of the tire.

Each member may, and preferably is made up in sections, with each section comprising a series of plates. The sections are connected by links 6, to provide flexibility of the member in applying the same to the tire, and the plates of each section are pivotally connected at 7 to provide the necessary movement between the plates. The members are of course arranged for removable connection at their ends, such connection on the inner member, that is the member applied to the inner side of the wheel, connected in Fig. 3, comprising a link 8 on one member end, adapted to engage any one of a series of notches 9 in the meeting end of the member. The outer member, that is the one on the outer side of the wheel is connected through a threaded rod 10, passed through ears 11 on the meeting ends of the members, the head of the rod engaging beyond one ear, and a nut 12 being held by the other ear to receive the threaded end of the rod. In this way, both inner and outer members are adjustably held in position, and the fastening of the outer member provides for securing the device as a whole in just the desired degree of tightness about the tire.

Each plate 5 is provided with a pair of traction lugs 13, secured in any appropriate manner to the plate. These lugs, which are in the nature of wing-like projections, project from the plates near the upper edge thereof. The wing surface of the projection is arranged at a particular angle to the line of traction, so that as the lug enters the soft surface it will have a tendency to create a flat bearing on such surface, as well as digging into the surface at an angle thereto, so as to thus create the most effective tractive addition to the wheel. The lugs are so arranged that they will have little or no effect when traveling over a hard surface, so that under such circumstances the usual vibration due to such contact is entirely avoided.

It is also contemplated that the upper edges of the plates shall be connected to assist in holding the device as a whole in place. As here shown such connection may consist of the usual chain sections 14, preferably so joined to the respective plates as to extend diagonally across the tire, thereby adding to the tractive power without that direct vibration incident to direct cross chains.

The improved tractive device can be readily applied to the wheel, the respective members being arranged next the proper side of the tire, with the inner member first connected to the desired tightness, then the outer member so connected. The side plates provide an armor for the sides of the tire casing, and yet are held so loosely in relation thereto as to entirely avoid any undue wear of the casing. The traction lugs are equally effective in either forward or rearward travel of the vehicle, and may of course be provided one for each plate or in any desired number.

Having thus described the invention, what is claimed as new, is:—

1. A traction device for tires comprising a flexible metallic member for the inner side of the casing, a flexible metallic member for the outer side of the casing, traction lugs on each member, and chains connecting the upper edges of the members and overlying the tread surface of the casing.

2. A traction device comprising metallic members for the respective side walls of the tire casing, each of said members including movably connected plates, each of said plates conforming to the shape of and bearing against the tire casing throughout substantially the full height of the side wall thereof, and a traction lug on each plate.

3. A traction device comprising metallic members for the respective sides of the tire casing, each of said members being made up of connected plates, and lugs projecting from the plates, each lug including a wing-like projection set at an angle to the line of traction.

4. A traction device comprising a series of connected plates arranged to overlie and conform to the respective sides of a tire casing, each of said plates overlying substantially the full height of the side wall of the casing, means for adjustably connecting the plates of each series into a tire conforming member, and chains connecting the edges of the plates and extending diagonally across the tire tread portion.

5. A wheel traction device comprising metallic plates connected for independent movement and to overlie and conform to the side walls of the tire casing, lugs projecting from such members and having wing-like portions projecting at an angle to the line of traction, and chains loosely connected to the respective plates and adapted to overlie the tread portion of the casing and diagonally thereof.

In testimony whereof I affix my signature.

JOHN WESLEY WHITE.